US011541414B2

(12) United States Patent
Hatanaka et al.

(10) Patent No.: US 11,541,414 B2
(45) Date of Patent: Jan. 3, 2023

(54) COATING DEVICE AND COATING METHOD

(71) Applicant: Panasonic Intellectual Property Management Co., Ltd., Osaka (JP)

(72) Inventors: Motoi Hatanaka, Osaka (JP); Kazuto Fukuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/343,343

(22) Filed: Jun. 9, 2021

(65) Prior Publication Data

US 2022/0001413 A1 Jan. 6, 2022

(30) Foreign Application Priority Data

Jul. 1, 2020 (JP) .............................. JP2020-114273

(51) Int. Cl.
*B05C 3/12* (2006.01)
*B05D 7/00* (2006.01)

(52) U.S. Cl.
CPC ............ *B05C 3/125* (2013.01); *B05D 7/5485* (2013.01)

(58) Field of Classification Search
None
See application file for complete search history.

(56) References Cited

U.S. PATENT DOCUMENTS

| 4,245,584 | A | * | 1/1981 | Kolosov | ............... H01M 4/043 141/2 |
| 5,665,160 | A | * | 9/1997 | Davene | ................... B05C 11/06 118/62 |
| 2019/0184668 | A1 | * | 6/2019 | Miyatake | ................ B30B 15/30 |
| 2019/0232328 | A1 | * | 8/2019 | Hatanaka | ............. B05D 3/0272 |

FOREIGN PATENT DOCUMENTS

| JP | 64-007965 | 1/1989 |
| JP | 2016-180579 | 10/2016 |
| JP | 2019-107577 | 7/2019 |
| JP | 2020-028843 | 2/2020 |
| WO | 2019/181916 | 9/2019 |

* cited by examiner

*Primary Examiner* — Jethro M. Pence
(74) *Attorney, Agent, or Firm* — Wenderoth, Lind & Ponack, L.L.P.

(57) ABSTRACT

A coating device configured to apply a coating liquid to both surfaces of a substrate that has a sheet shape and is transported. The coating device includes: a pair of blocks facing each other in a thickness direction of the substrate; and a liquid reservoir that is formed such that the coating liquid is accumulated in a gap between the pair of blocks, and through which the substrate passes, wherein the liquid reservoir includes: an introduction port that is opened on an upstream side in a transport direction of the substrate and through which the substrate is introduced, a discharge port that is opened on a downstream side in the transport direction and through which the substrate is discharged, and side surface portions respectively positioned on both sides in a width direction intersecting the transport direction, at least a (Continued)

side surface portion on one side of the both sides in the width direction among the side surface portions has an exposure port that is opened from the introduction port to the discharge port, and a part of the substrate in the width direction is configured to protrude from the exposure port to an outside of the liquid reservoir.

10 Claims, 13 Drawing Sheets

COATING DEVICE AND COATING METHOD

BACKGROUND

1. Technical Field

The present disclosure relates to a coating device and a coating method.

2. Description of the Related Art

Various techniques related to a coating device for forming coating films on both surfaces of a sheet-shaped substrate transported by, for example, a roll-to-roll method have been disclosed.

For example, in an applying device (coating device) disclosed in Japanese Unexamined Patent Application Publication No. 64-7965, first, an elongated sheet-shaped substrate that is continuously transported is immersed in an immersion tank in which a coating liquid is accumulated, and thus the coating liquid is applied to both surfaces of the substrate. Thereafter, while the substrate is raised in a vertical direction, excess coating liquid on both surfaces of the substrate is scraped off by a pair of scraping rolls. As a result, coating films each having a constant thickness are formed on both surfaces of the substrate.

SUMMARY

According to an aspect of the present disclosure, a coating device configured to apply a coating liquid to both surfaces of a substrate that has a sheet shape and is transported. The coating device includes: a pair of blocks facing each other in a thickness direction of the substrate; and a liquid reservoir that is formed such that the coating liquid is accumulated in a gap between the pair of blocks, and through which the substrate passes, wherein the liquid reservoir includes: an introduction port that is opened on an upstream side in a transport direction of the substrate and through which the substrate is introduced, a discharge port that is opened on a downstream side in the transport direction and through which the substrate is discharged, and side surface portions respectively positioned on both sides in a width direction intersecting the transport direction, at least a side surface portion on one side of the both sides in the width direction among the side surface portions has an exposure port that is opened from the introduction port to the discharge port, and a part of the substrate in the width direction is configured to protrude from the exposure port to an outside of the liquid reservoir.

DETAILED DESCRIPTIONS

There is a case in which it is desired to selectively form coating films on both surfaces of a specific portion of a substrate in a width direction. In this case, it is necessary to apply a coating liquid to both surfaces of the specific portion of the substrate in the width direction and not to apply the coating liquid to portions other than the specific portion.

However, when the coating films are to be selectively formed on both surfaces of the specific portion of the substrate in the width direction by using the coating device according to Japanese Unexamined Patent Application Publication No. 64-7965, it is necessary to adjust an orientation of the substrate itself, a transport direction of the substrate, and the like such that only the specific portion of the substrate is immersed in the immersion tank, and there is a problem that a coating process is complicated and the coating device is increased in size.

The present disclosure has been made in view of such a point, and a main object of the present disclosure is to make it possible to selectively form coating films on both surfaces of a specific portion in a width direction of a substrate being transported.

Hereinafter, embodiments of the present disclosure will be described in detail with reference to drawings. The following description of the preferred embodiments is merely illustrative in nature, and is not intended to limit the present disclosure, applications thereof, or uses thereof at all.

First Embodiment

Basic Configuration

Figure 1:
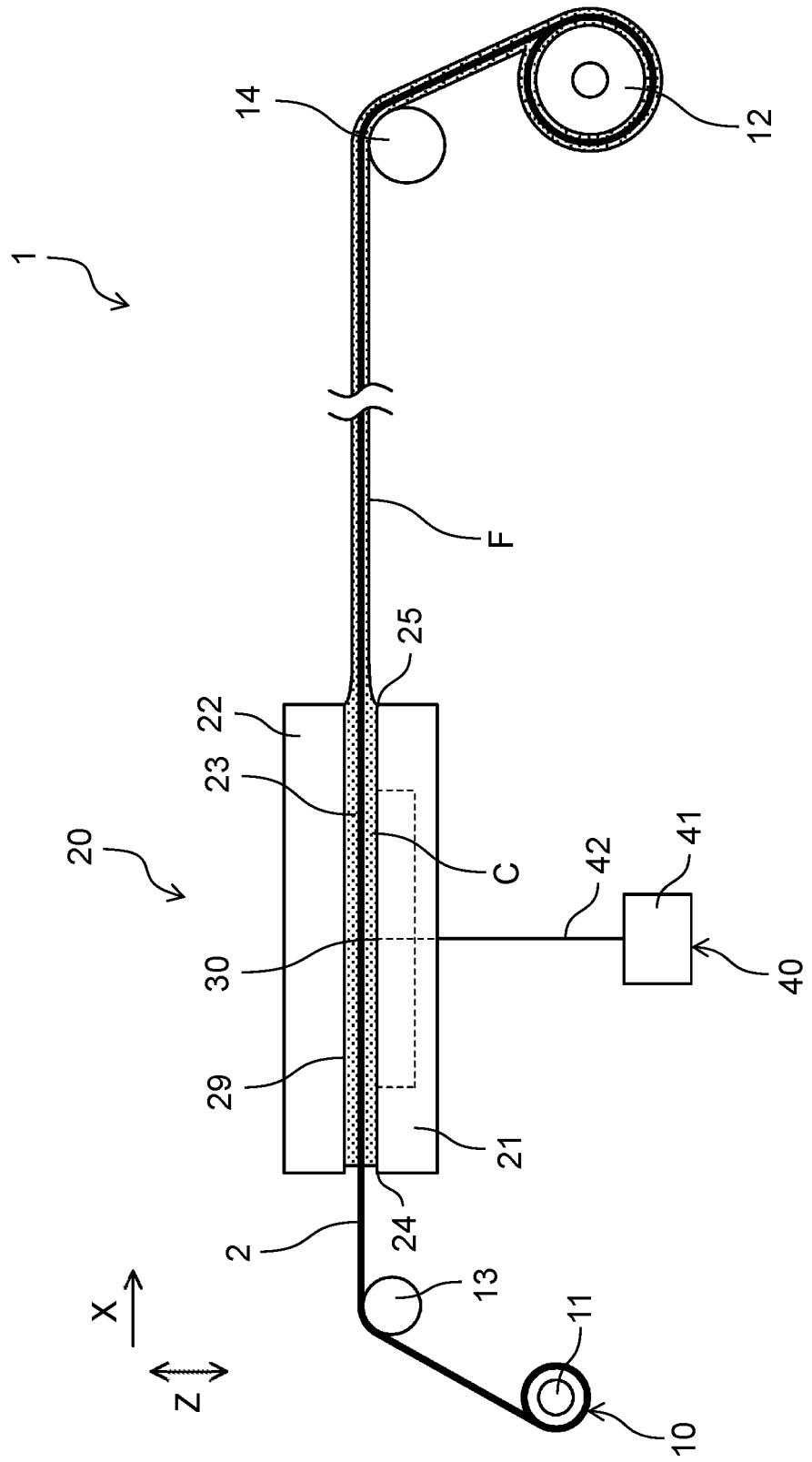
FIG. 1 is a diagram schematically showing a coating system including a coating device according to a first embodiment of the present disclosure.

FIG. 1 is a diagram schematically showing coating system 1 according to a first embodiment of the present disclosure. Coating system 1 is for continuously forming coating films F on both surfaces of substrate 2. Coating system 1 includes substrate supply device 10, coating device 20, and coating liquid supply device 40.

Substrate 2 is formed in an elongated sheet shape. Examples of substrate 2 include a metal foil, a resin film, a woven fabric, a nonwoven fabric, and paper. Thickness dimension t (see FIG. 5) of substrate 2 not including coating films F is, for example, 1 mm or less.

Substrate supply device 10 continuously transports substrate 2 by a roll-to-roll method with a longitudinal direction of substrate 2 as a transport direction (indicated by X). Specifically, substrate supply device 10 continuously transports substrate 2 by unwinding substrate 2 by unwinder 11 and winding substrate 2 by winder 12. Transported substrate 2 passes through first roll 13 and second roll 14 in the middle.

Coating device 20 is disposed between first roll 13 and second roll 14 in the transport direction of substrate 2. As will be described in detail later, coating device 20 applies coating liquid C to both surfaces of sheet-shaped substrate 2 which is continuously transported, and forms coating films F on both surfaces of substrate 2. Substrate 2 having coating films F formed on both surfaces thereof by coating device 20 is dried in a drying furnace (not shown) to remove volatile components contained in coating films F, and then substrate 2 is wound onto winder 12.

Figure 2:
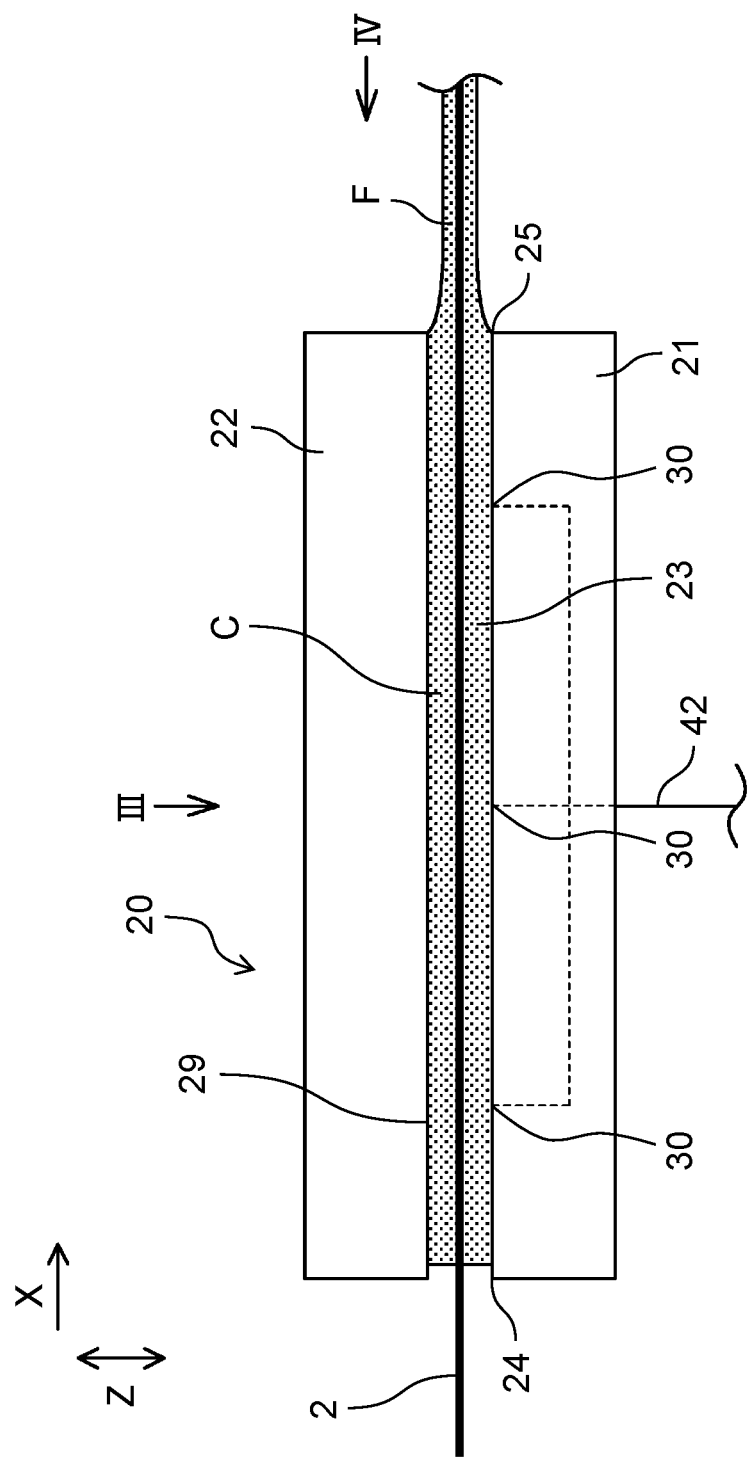
FIG. 2 is a front view of the coating device according to the first embodiment.
Figure 3:
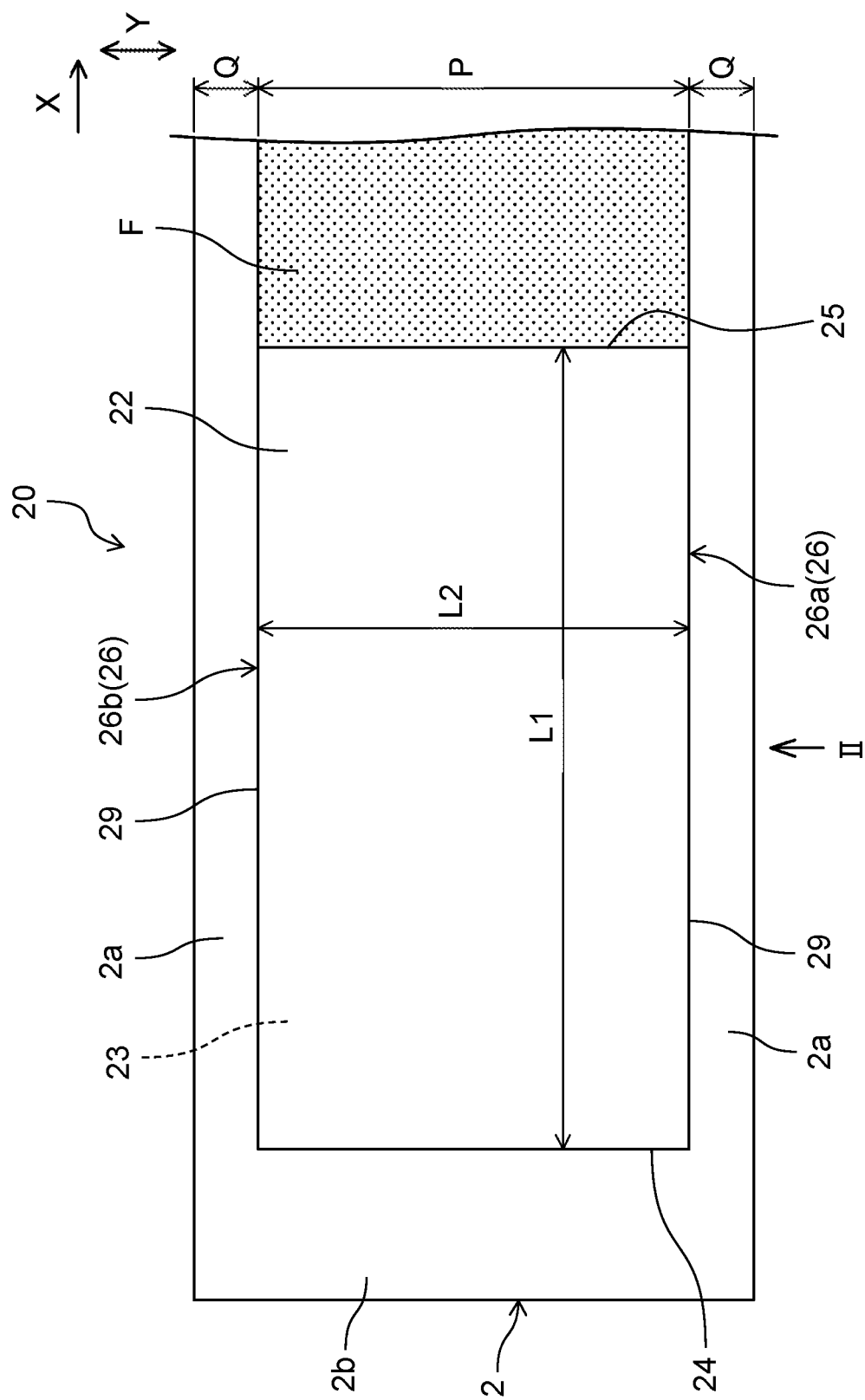
FIG. 3 is a plan view of the coating device according to the first embodiment.
Figure 4:
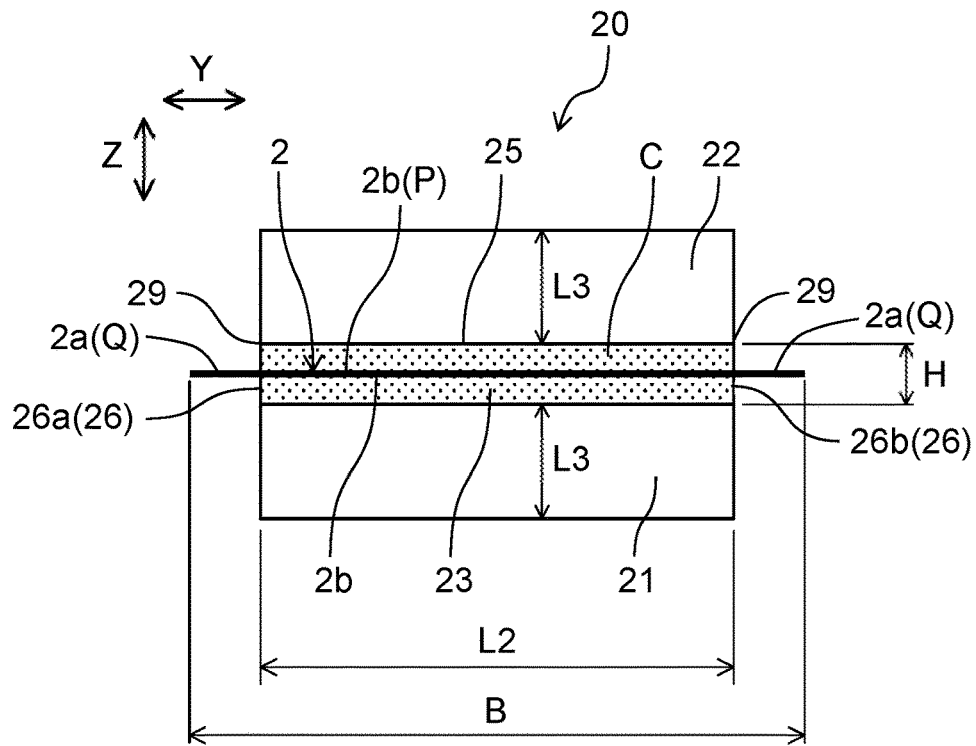
FIG. 4 is a side view of the coating device according to the first embodiment.
Figure 5:
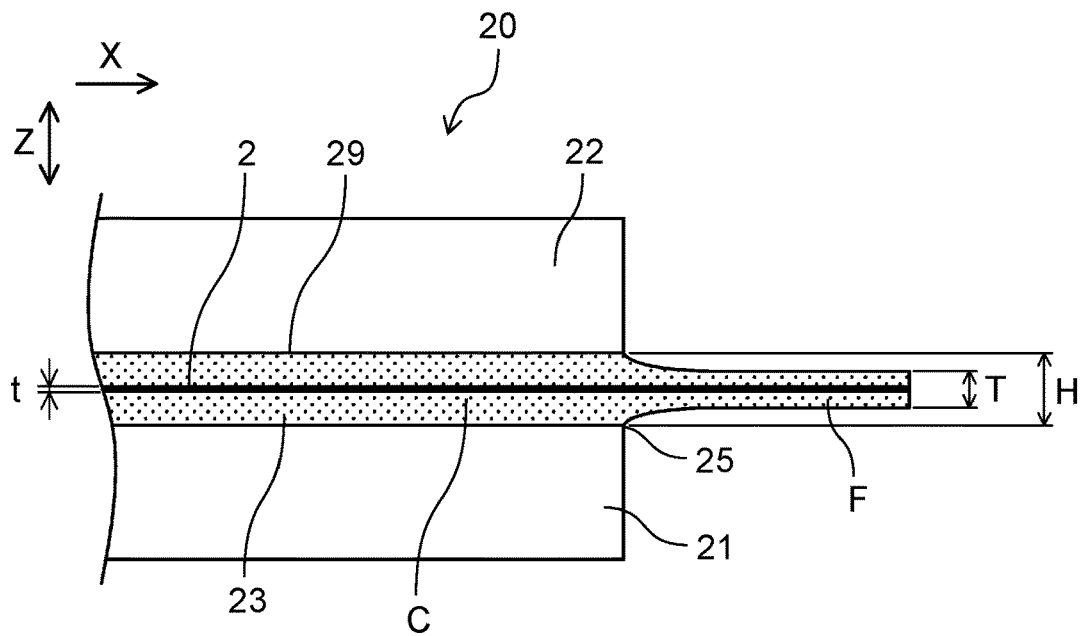
FIG. 5 is an enlarged front view showing a vicinity of a discharge port of the coating device according to the first embodiment in an enlarged manner.

A configuration of coating device 20 will be described in detail. FIGS. 2 to 5 show coating device 20 according to the present embodiment, FIG. 2 is a front cross-sectional view (as viewed in a direction indicated by arrow II), FIG. 3 is a side view (as viewed in a direction indicated by arrow III), FIG. 4 is a plan view (as viewed in a direction indicated by arrow IV), and FIG. 5 is an enlarged front view of a vicinity of discharge port 25 to be described later.

In the present embodiment, the transport direction (longitudinal direction) of substrate 2 substantially coincides with a horizontal direction orthogonal to a vertical direction. A thickness direction (indicated by Z) of substrate 2 substantially coincides with the vertical direction. A width direction (indicated by Y) of substrate 2 substantially coincides with a horizontal direction intersecting the transport direction of substrate 2, specifically, a horizontal direction orthogonal to the transport direction.

As shown in FIG. 2, coating device 20 includes a pair of blocks, specifically, first block 21 and second block 22. First block 21 and second block 22 are disposed with a predetermined interval from each other in the thickness direction of substrate 2, and face each other in the thickness direction of substrate 2. Each of blocks 21, 22 is formed in a substantially rectangular parallelepiped shape, and is disposed such that a longitudinal direction thereof is along the transport direction of substrate 2.

In FIGS. 3 and 4, L1 is a length dimension of each of blocks 21, 22. L2 is a width dimension of each of blocks 21, 22. L3 is a thickness dimension of each of blocks 21, 22.

It is preferable that length dimension L1 of each of blocks 21, 22 is sufficiently larger than thickness dimension t (see FIG. 5) of substrate 2. Specifically, length dimension L1 of each of blocks 21, 22 is preferably 100 times or more, more preferably 500 times or more, thickness dimension t of substrate 2.

As shown in FIG. 4, in the present embodiment, width dimension L2 of each of blocks 21, 22 is smaller than width dimension B of substrate 2.

As shown in FIG. 2, in gap 23 between the pair of blocks, that is, in gap 23 between first block 21 and second block 22, a liquid reservoir portion is formed, so that coating liquid C is accumulated (hereinafter, referred to as "liquid reservoir portion 23"). Substrate 2 passes through liquid reservoir portion 23, thus coating liquid C is applied to both surfaces of substrate 2, and coating films F are formed on both surfaces of substrate 2.

Coating liquid C is preferably in a paste form or in a slurry form, and for example, coating liquid C having viscosity $\eta$ of 1 mPa·s or more can be applied to both surfaces of substrate 2. For example, it is preferable to apply coating liquid C having viscosity $\eta$ of 1 Pa·s to 1000 Pa·s, because coating films F can be smoothly formed on both surfaces of substrate 2 when coating liquid C having viscosity $\eta$ of 1 Pa·s to 1000 Pa·s is applied.

As coating liquid C, an insulator material containing particles of a metal oxide such as silica, low-melting glass, alumina, or titanium oxide; metal particles of such as solder, copper, silver, or metal-coated particles; a conductive material containing lithium nickelate, lithium manganate, lithium cobaltate, carbon, or the like; a dye, or the like can be used.

H indicates a gap dimension between first block 21 and second block 22. In the present embodiment, gap dimension H is uniform over the transport direction and the width direction. Gap dimension H is larger than thickness dimension t (for example, 0.1 mm or less) of substrate 2, so that substrate 2 can pass through gap dimension H. Gap dimension H may be as small as possible. Specifically, gap dimension H is preferably 0.1 mm or more and 1 mm or less.

The liquid reservoir portion 23 has introduction port 24 that is opened on an upstream side (left side in FIG. 2) in the transport direction of substrate 2, and discharge port 25 that is opened on a downstream side (right side in FIG. 2) in the transport direction of substrate 2. Introduction port 24 and discharge port 25 face each other in the transport direction. Substrate 2 is introduced from introduction port 24, passes through liquid reservoir portion 23, and is discharged from discharge port 25.

As shown in FIGS. 3 and 4, liquid reservoir portion 23 includes side surface portions 26 positioned on both sides of substrate 2 in the width direction. Side surface portions 26 includes first side surface portion 26a on one side in the width direction and second side surface portion 26b on the other side in the width direction. First side surface portion 26a and second side surface portion 26b face each other in the width direction.

Side surface portion 26 on at least one side in the width direction includes exposure port 29. In the present embodiment, as shown in FIG. 4, exposure ports 29 are respectively provided in side surface portions 26 on both sides in the width direction, that is, first side surface portion 26a and second side surface portion 26b. Each exposure port 29 is opened from an introduction port 24 side (upstream side) to a discharge port 25 side (downstream side) in each of first side surface portion 26a and second side surface portion 26b (see FIG. 2). That is, first side surface portion 26a and second side surface portion 26b are opened.

As shown in FIG. 4, a part of substrate 2 in the width direction can protrude from exposure ports 29 to the outside of liquid reservoir portion 23.

Coating liquid supply port 30 for supplying coating liquid C to liquid reservoir portion 23 is provided on a surface of first block 21 facing liquid reservoir portion 23. In the present embodiment, a plurality of (for example, three) coating liquid supply ports 30 are provided adjacently in the transport direction in a central portion of first block 21 in the width direction. The number of coating liquid supply ports 30 may be one.

Here, coating liquid supply device 40 (see FIG. 1) is a device for supplying coating liquid C to coating device 20, and includes supply pump 41 and supply path 42. Coating liquid supply port 30 communicates with supply pump 41 via supply path 42. Coating liquid C pressure-fed by supply pump 41 passes through supply path 42 and is supplied from coating liquid supply port 30 to liquid reservoir portion 23. As a result, coating liquid C is accumulated in liquid reservoir portion 23. A cross-sectional shape of coating liquid supply port 30 is, for example, a circular shape or an elliptical shape. A diameter of coating liquid supply port 30 is preferably, for example, 1 mm or more. A supply rate of coating liquid C by supply pump 41 is preferably substantially coincides with a discharge rate of coating liquid C discharged from discharge port 25.

Although not shown, coating device 20 may include a coating liquid discharge mechanism. The coating liquid discharge mechanism removes coating liquid C accumulated in liquid reservoir portion 23 when coating is stopped.

State of Coating

A state (state of coating) in which coating liquid C is applied to both surfaces of substrate 2 by coating device 20 to form coating films F on both surfaces of substrate 2 will be described.

First, as shown in FIG. 3, a portion in the width direction of substrate 2 to which coating liquid C is applied is specified, and the specified portion is defined as specific portion P. A portion other than specific portion P in the width direction is defined as non-specific portion Q to which coating liquid C is not applied.

In the present embodiment, middle portion 2b of substrate 2 in the width direction is defined as specific portion P. On the other hand, both end portions 2a in the width direction, which are portions of substrate 2 in the width direction other than specific portion P (middle portion 2b in the width direction), are defined as non-specific portions Q.

As shown in FIGS. 3 and 4, a position of substrate 2 in the width direction is adjusted such that specific portion P of substrate 2 passes through liquid reservoir portion 23, and meanwhile, non-specific portions Q of substrate 2 do not pass through liquid reservoir portion 23. Specifically, each of non-specific portions Q (each of both end portions 2a in the width direction) of substrate 2 that passes through coating device 20 is protruded from each of exposure ports 29 to the outside of liquid reservoir portion 23.

Substrate 2 passes through coating device 20, thus coating liquid C is applied to both surfaces of specific portion P of substrate 2, and coating films F are formed on both surfaces of specific portion P of substrate 2. On the other hand, since coating liquid C is not applied to both surfaces of each of non-specific portions Q of substrate 2, coating film F is not formed.

When substrate 2 is discharged from discharge port 25, a strong shearing force is applied to coating liquid C applied to both surfaces of specific portion P of substrate 2 in the vicinity of discharge port 25. Therefore, as shown in FIG. 5, thickness dimension T of substrate 2 including coating films F is slightly smaller than gap dimension H of discharge port 25 (liquid reservoir portion 23). As a result, surfaces of coating films F are smoothed, and appearance thereof is improved.

Function and Effect

According to the present disclosure, films can be selectively formed on both surfaces of a specific portion of a transported substrate in a width direction. Specifically, since exposure port 29 is provided in side surface portions 26 on at least one side in the width direction, a part of substrate 2 in the width direction that passes through coating device 20 can protrude from exposure port 29 to the outside of liquid reservoir portion 23.

That is, in the width direction of substrate 2, a portion to which coating liquid C is applied is defined as specific portion P, and a portion that is other than specific portion P and to which coating liquid C is not applied is defined as non-specific portion Q. Then, substrate 2 passes through coating device 20 while non-specific portions Q of substrate 2 protrude from exposure ports 29 to the outside of liquid reservoir portion 23. Therefore, coating liquid C can be applied to both surfaces of specific portion P of substrate 2 without applying coating liquid C to both surfaces of non-specific portions Q of substrate 2.

Therefore, coating films F can be selectively formed on both surfaces of specific portion P of transported substrate 2 in the width direction.

In the present embodiment, since exposure port 29 is provided in each of first side surface portion 26a and second side surface portion 26b on both sides in the width direction, when width dimension B of substrate 2 is larger than width dimension L2 of each of blocks 21, 22 (width dimension of liquid reservoir portion 23), both end portions 2a of substrate 2 in the width direction can be protruded from each of exposure ports 29 to the outside of liquid reservoir portion 23.

By reducing gap dimension H to, for example, 0.1 mm to 1 mm, ratio $\rho$ [kg/(m$^2$·s)×10$^3$] of viscosity $\eta$ [Pa·s] of coating liquid C to gap dimension H [mm] can be increased as much as possible. By increasing ratio $\rho$ (preferably, 75 or more), it is advantageous in preventing leakage of coating liquid C from liquid reservoir portion 23. Ratio $\rho$ can also be increased by increasing viscosity $\eta$ of coating liquid C.

By setting viscosity $\eta$ of coating liquid C to, for example, 1 Pa·s to 1000 Pa·s, it is possible to realize prevention of the leakage of coating liquid C from liquid reservoir portion 23, improvement of surface roughness of coating film F, reduction of a pressure loss of coating liquid C in supply path 42, and the like.

Since the transport direction of substrate 2 substantially coincides with the horizontal direction, coating liquid C accumulated in liquid reservoir portion 23 is supported by first block 21 positioned below coating liquid C in the vertical direction (thickness direction). As a result, it is more advantageous in preventing the leakage of coating liquid C from liquid reservoir portion 23.

By setting length dimension L1 of each of blocks 21, 22 sufficiently larger than thickness dimension t of substrate 2, it is possible to prevent coating omission on both surfaces of specific portion P of substrate 2 and to increase a coating ratio.

By increasing the diameter of coating liquid supply port 30 to, for example, 1 mm or more, the pressure loss of coating liquid C supplied to liquid reservoir portion 23 can be reduced.

For example, in a clip coating method, a substrate is introduced into an immersion tank from an upper introduction port, the substrate is passed through the immersion tank, and the substrate is discharged from an upper discharge port. Therefore, it is necessary to change the transport direction of substrate 2 many times, and the device is large in size and complicated. Since a large amount of coating liquid C needs to be accumulated in the immersion tank, it is disadvantageous in cost particularly when expensive coating liquid C is used. According to the present embodiment, since introduction port 24 and discharge port 25 face each other in the transport direction of substrate 2, as compared with the dip coating method, the device can be made smaller and simpler, and an amount of coating liquid C can be reduced to achieve cost reduction.

Second Embodiment

Figure 6:
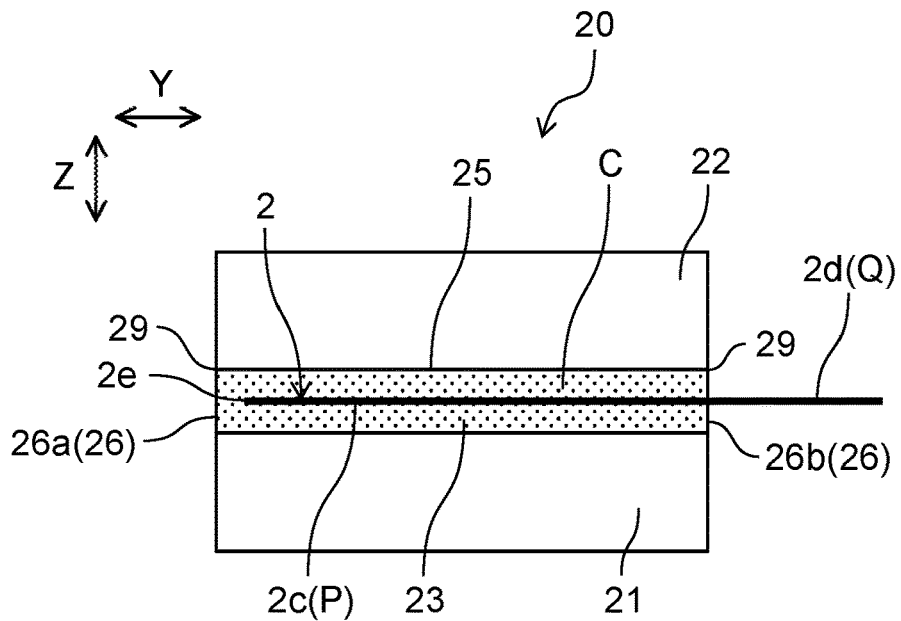
FIG. 6 is a side view of a coating device according to a second embodiment.

Coating device 20 according to a second embodiment will be described with reference to FIG. 6. In the following description, the same components as those of the above-described embodiment are denoted by the same reference numerals, and a detailed description thereof may be omitted.

In the present embodiment, one side 2c of substrate 2 in the width direction is defined as specific portion P. On the other hand, the other side 2d of substrate 2 in the width direction is defined as non-specific portion Q.

In the present embodiment, coating liquid C is also applied to side surface 2e of substrate 2 on one side in the width direction to form coating film F. Here, by setting length dimension L1 of each of blocks 21, 22 sufficiently larger than thickness dimension t of substrate 2, coating liquid C sufficiently wraps around side surface 2e of substrate 2 on one side in the width direction.

For example, in a coating method using a slit die, it is difficult to apply coating liquid C to side surface 2e of substrate 2. Therefore, from a viewpoint that coating liquid C can be applied to side surface 2e of substrate 2, coating device 20 according to the present embodiment is advantageous in a coating method using the slit die.

Third Embodiment

Figure 7:
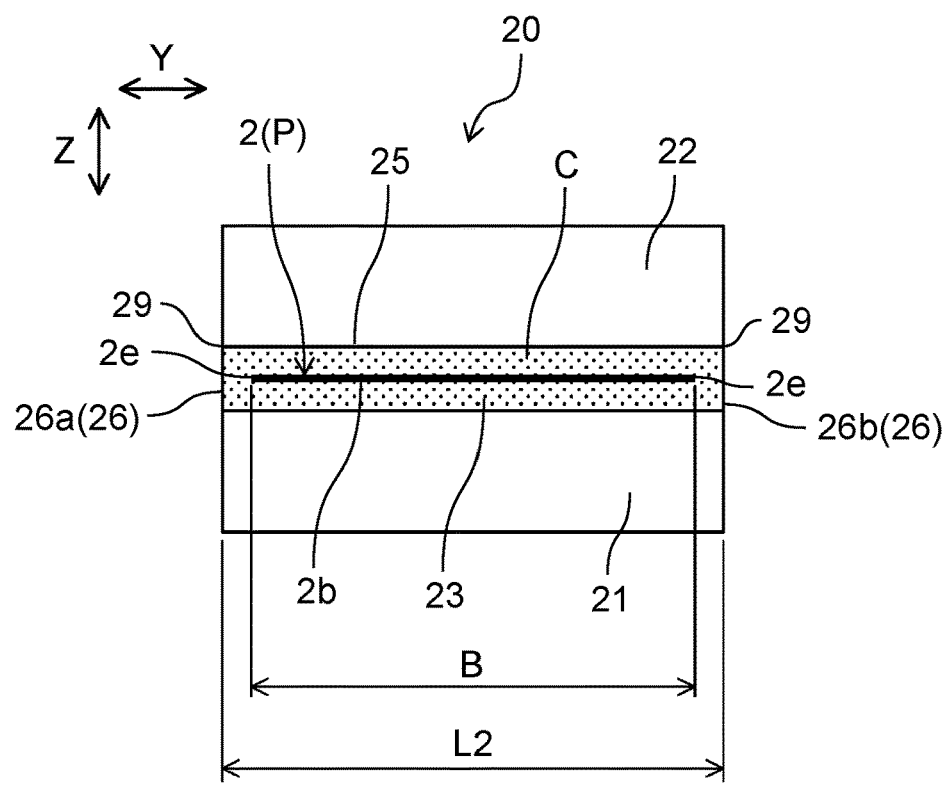
FIG. 7 is a side view of a coating device according to a third embodiment.

Coating device 20 according to a third embodiment will be described with reference to FIG. 7. In the following description, the same components as those of the above-described embodiment are denoted by the same reference numerals, and a detailed description thereof may be omitted.

In the present embodiment, width dimension B of substrate 2 is smaller than width dimension L2 of each of blocks 21, 22 (width dimension of liquid reservoir portion 23). Entire substrate 2 in the width direction is defined as specific portion P, and non-specific portion Q is not provided. That is, coating liquid C is applied to both surfaces of entire substrate 2 in the width direction to form coating films F (full coating).

In this way, it is not always necessary to protrude a part of substrate 2 in the width direction from exposure ports 29 to the outside of liquid reservoir portion 23.

In the present embodiment, coating liquid C is also applied to side surfaces 2e of substrate 2 on both sides in the width direction to form coating films F.

Fourth Embodiment

Figure 8:
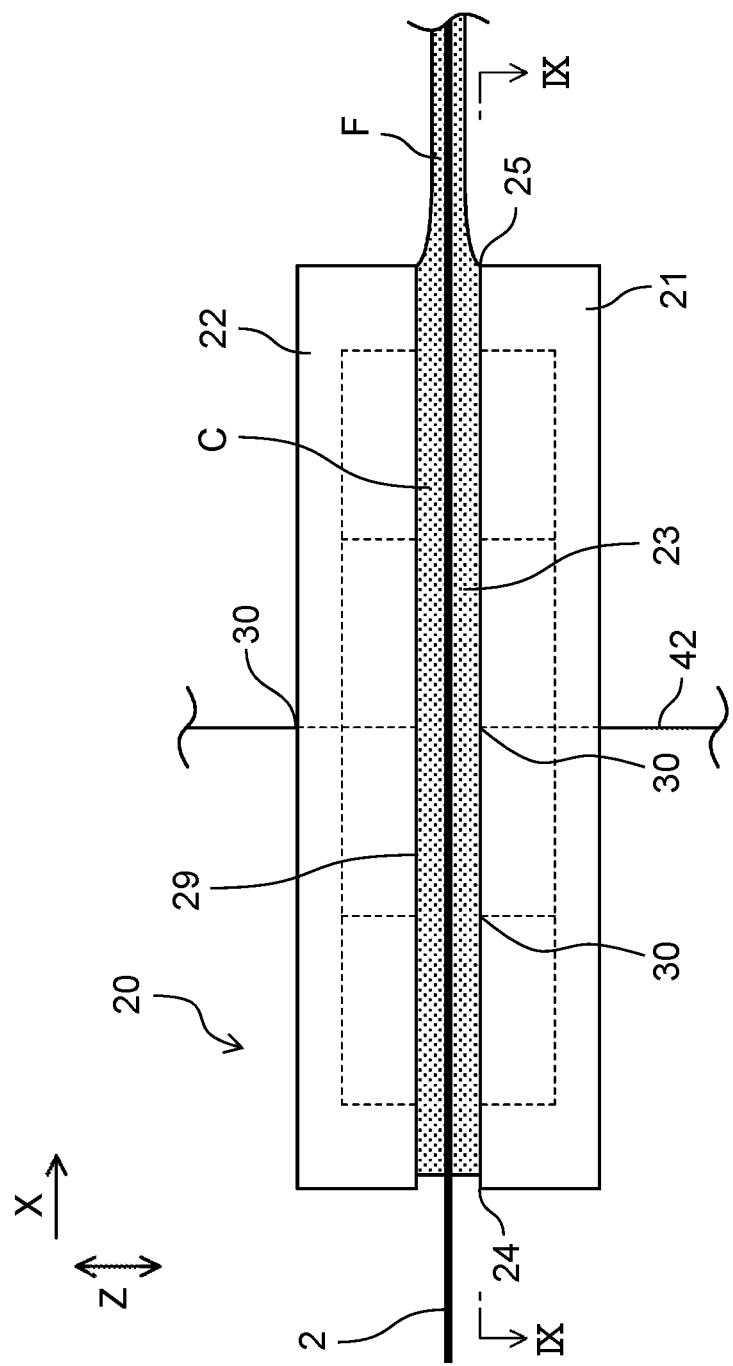
FIG. 8 is a front view of a coating device according to a fourth embodiment.
Figure 9:
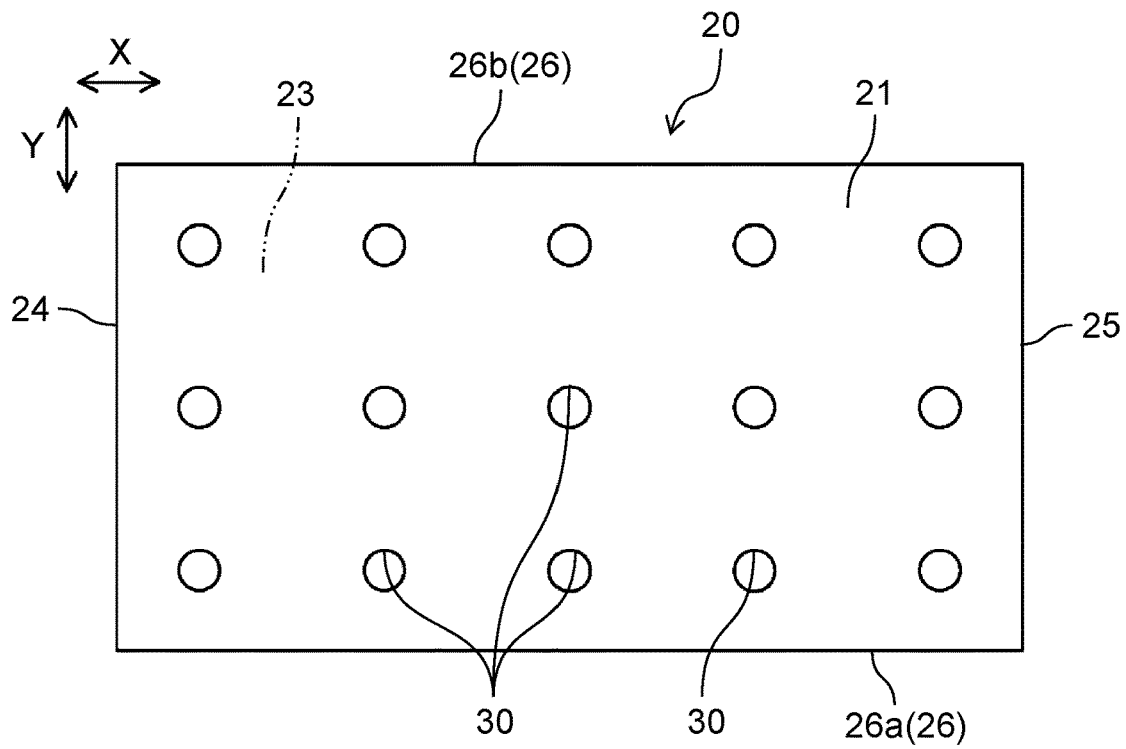
FIG. 9 is a plan view showing a cross-section of the coating device according to the fourth embodiment.

Coating device 20 according to a fourth embodiment will be described with reference to FIGS. 8 and 9. In the following description, the same components as those of the above-described embodiment are denoted by the same reference numerals, and a detailed description thereof may be omitted. FIG. 9 is a cross-sectional view taken along a line IX-IX in FIG. 8.

In the present embodiment, each of first block 21 and second block 22 is provided with a plurality of coating liquid supply ports 30 on the surface facing liquid reservoir portion 23. Each coating liquid supply port 30 is for supplying coating liquid C to liquid reservoir portion 23, and communicates with supply pump 41 via supply path 42.

In the present embodiment, each coating liquid supply port 30 is a circular round hole. The number of coating liquid supply ports 30 provided in each of blocks 21, 22 is equal to each other. Coating liquid supply port 30 in block 21 and coating liquid supply port 30 in block 22 face each other in the thickness direction with liquid reservoir portion 23 interposed therebetween.

According to the present embodiment, since coating liquid C is supplied from first block 21 and second block 22 to liquid reservoir portion 23 so as to face each other in the thickness direction of substrate 2, substrate 2 can be restricted to a vicinity of a center of liquid reservoir portion 23 in the thickness direction by a liquid pressure at this time. As a result, coating liquid C can be stably and uniformly applied to both surfaces of substrate 2, so that coating films F in good quality can be formed on both surfaces of substrate 2. By restricting substrate 2 to the vicinity of the center of liquid reservoir portion 23 in the thickness direction, it is possible to prevent substrate 2 from coming into contact with each of blocks 21, 22, and to prevent coating films F formed on both surfaces of substrate 2 from being damaged.

Fifth Embodiment

Figure 10:
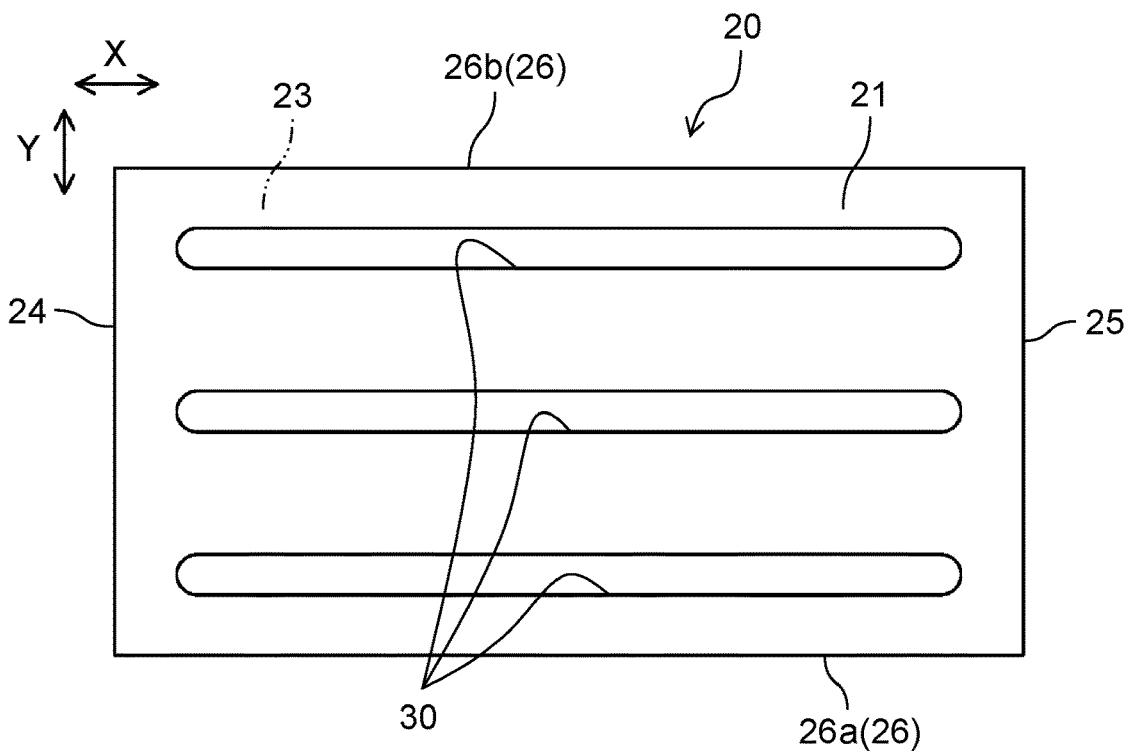
FIG. 10 is a plan view showing a cross-section of a coating device according to a fifth embodiment.

Coating device 20 according to a fifth embodiment will be described with reference to FIG. 10. In the following description, the same components as those of the above-described embodiment are denoted by the same reference numerals, and a detailed description thereof may be omitted.

In the present embodiment, each coating liquid supply port 30 is an elliptical elongated hole extending in the longitudinal direction of each of blocks 21, 22 (transport direction of substrate 2). A width of each coating liquid supply port (elongated hole) 30 is preferably, for example, 1 mm or more. Other configurations are similar as those in the fourth embodiment.

Sixth Embodiment

Figure 11:
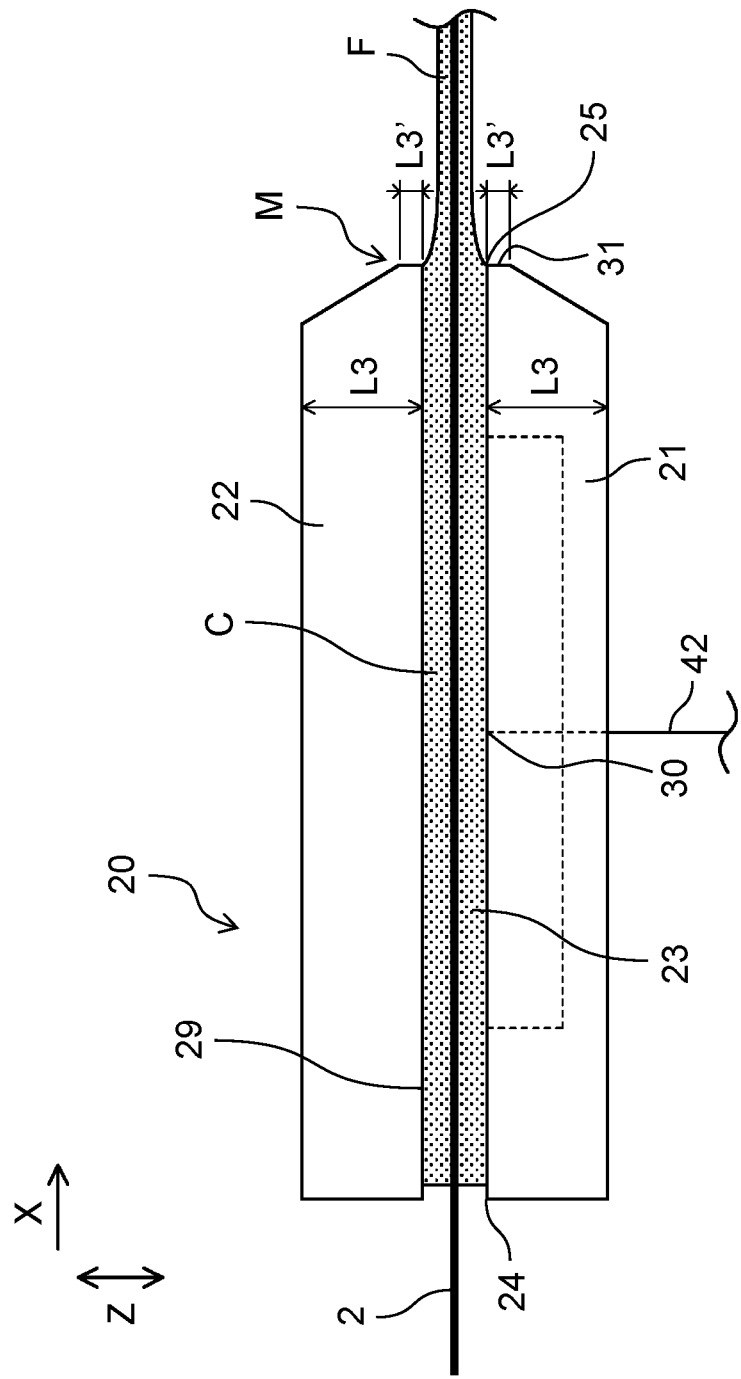
FIG. 11 is a front view of a coating device according to a sixth embodiment.

Coating device 20 according to a sixth embodiment will be described with reference to FIG. 11. In the following description, the same components as those of the above-described embodiment are denoted by the same reference numerals, and a detailed description thereof may be omitted.

In the present embodiment, opening edge portion 31 of discharge port 25 in each of first block 21 and second block 22 has a thickness smaller than other portions of blocks 21, 22 in the transport direction, and wetting and spreading prevention portion M that prevents wetting and spreading of coating liquid C is formed.

That is, wetting and spreading prevention portion M is formed by making thickness dimension L3' of opening edge portion 31 of discharge port 25 in each of blocks 21, 22 smaller than thickness dimension L3 of other portions of each of blocks 21, 22 in the transport direction. Thickness dimension L3' is preferably as small as possible, and is, for example, preferably 5 mm or less, and more preferably 1 mm or less.

When substrate 2 is discharged from discharge port 25, coating liquid C applied to both surfaces of substrate 2 may wet and spread on the surfaces of blocks 21, 22 on discharge port 25 side. Therefore, according to the present embodiment, thickness dimension L3' of opening edge portion 31 of discharge port 25 in each of blocks 21, 22 is reduced to reduce an area of the surface on which coating liquid C wets and spreads. As a result, coating liquid C can be prevented from wetting and spreading on the surfaces of blocks 21, 22 on discharge port 25 side, and coating films F can be stably and uniformly formed on both surfaces of substrate 2.

Seventh Embodiment

Figure 12:
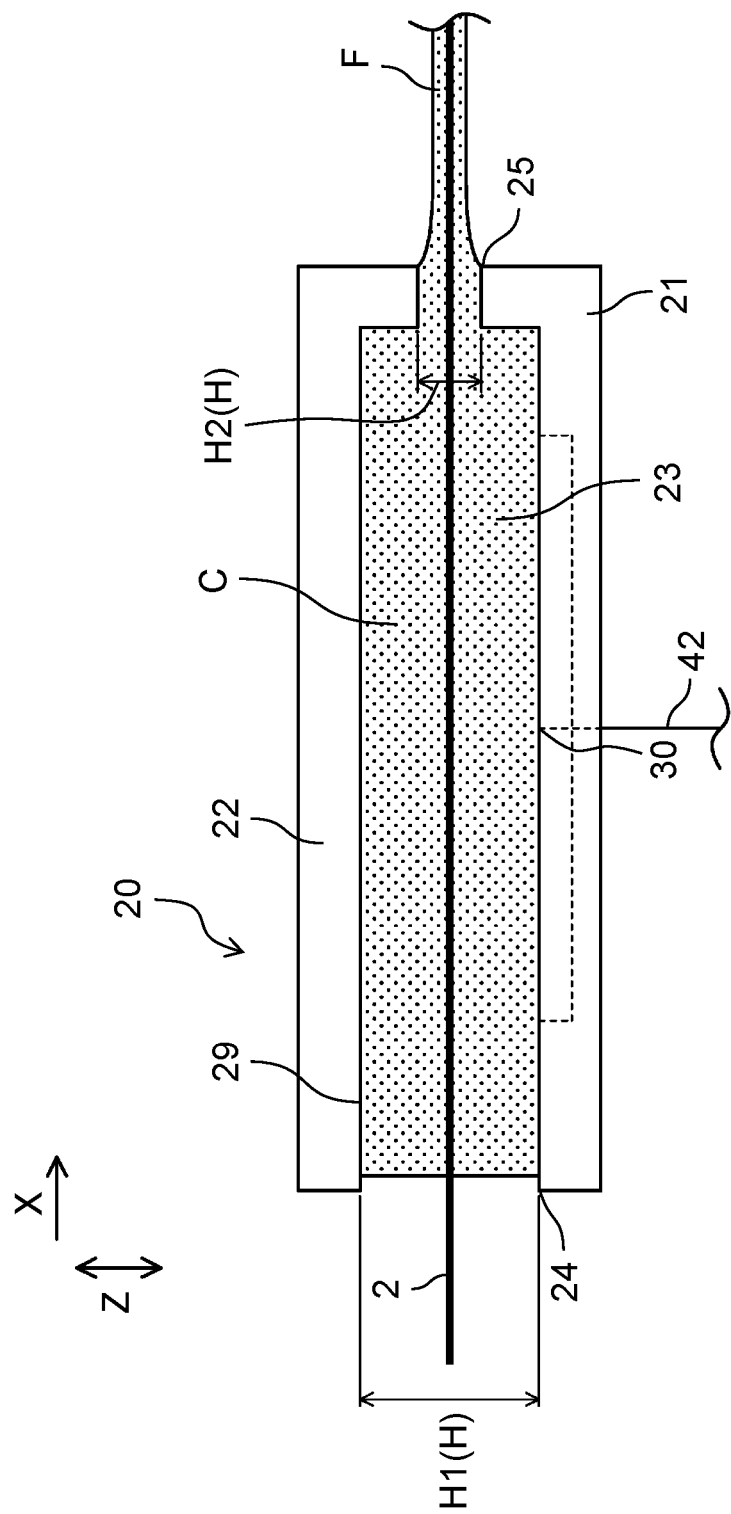
FIG. 12 is a front view of a coating device according to a seventh embodiment.

Coating device 20 according to a seventh embodiment will be described with reference to FIG. 12. In the following description, the same components as those of the above-described embodiment are denoted by the same reference numerals, and a detailed description thereof may be omitted.

In the present embodiment, gap (liquid reservoir portion) 23 between first block 21 and second block 22, is wider on introduction port 24 side than on discharge port 25 side. Specifically, gap dimension H1 at introduction port 24 is larger than gap dimension H2 at discharge port 25.

According to the present embodiment, contact between substrate 2 and each of blocks 21, 22 at introduction port 24 can be prevented by increasing gap dimension H1 at introduction port 24. By setting gap dimension H2 at discharge port 25 to a predetermined value, a thickness of coating films F formed on both surfaces of substrate 2 can be determined.

Eighth Embodiment

Figure 13:
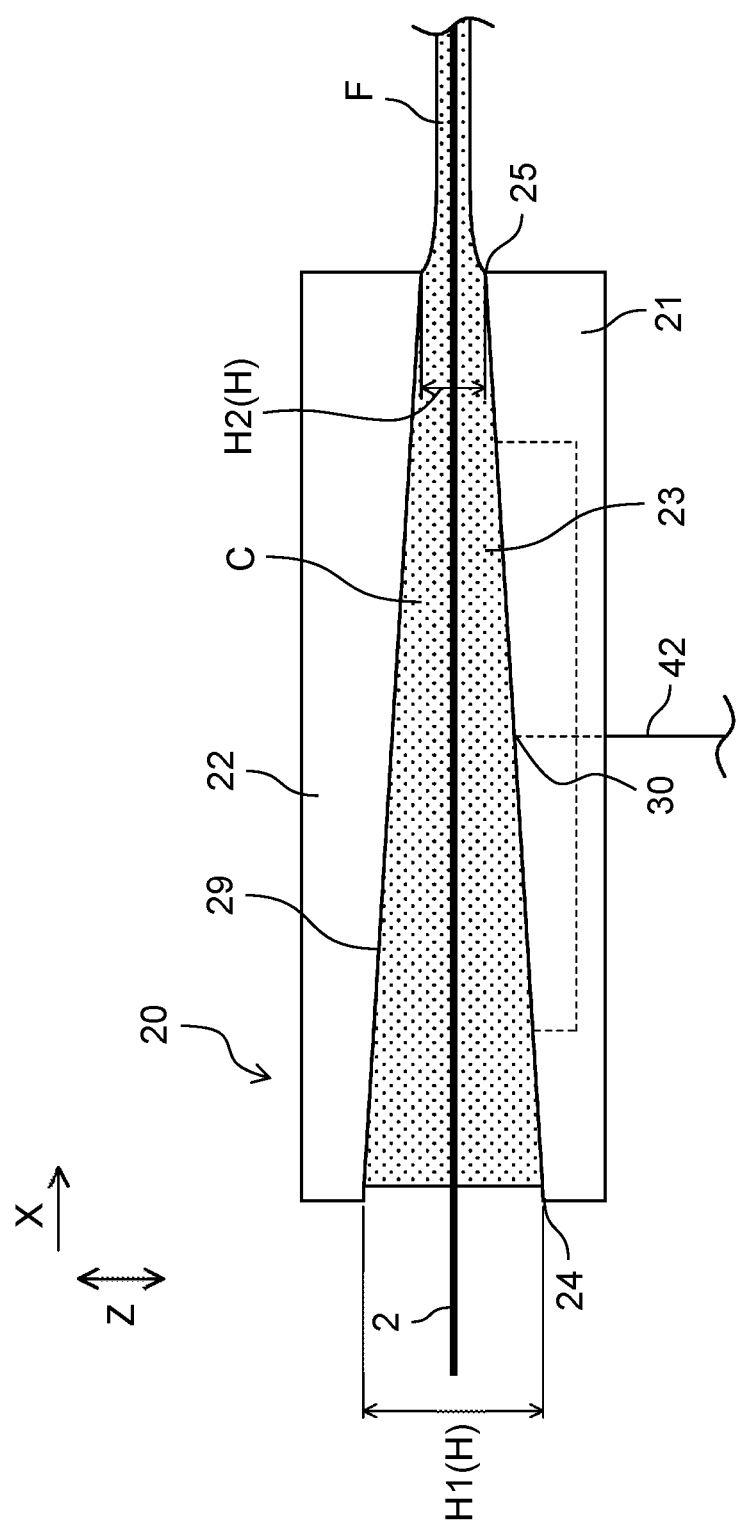
FIG. 13 is a front view of a coating device according to an eighth embodiment.

Coating device 20 according to an eighth embodiment will be described with reference to FIG. 13. In the following description, the same components as those of the above-described embodiment are denoted by the same reference numerals, and a detailed description thereof may be omitted.

In the present embodiment, in addition to the seventh embodiment, gap (liquid reservoir portion) 23 between first block 21 and second block 22 is narrowed from introduction port 24 side toward discharge port 25 side in the transport direction of substrate 2. That is, gap (liquid reservoir portion) 23 between first block 21 and second block 22 is formed in a taper shape.

According to the present embodiment, in addition to the effects of the seventh embodiment, retention of coating liquid C in liquid reservoir portion (gap) 23 can be prevented.

Ninth Embodiment

Figure 14:
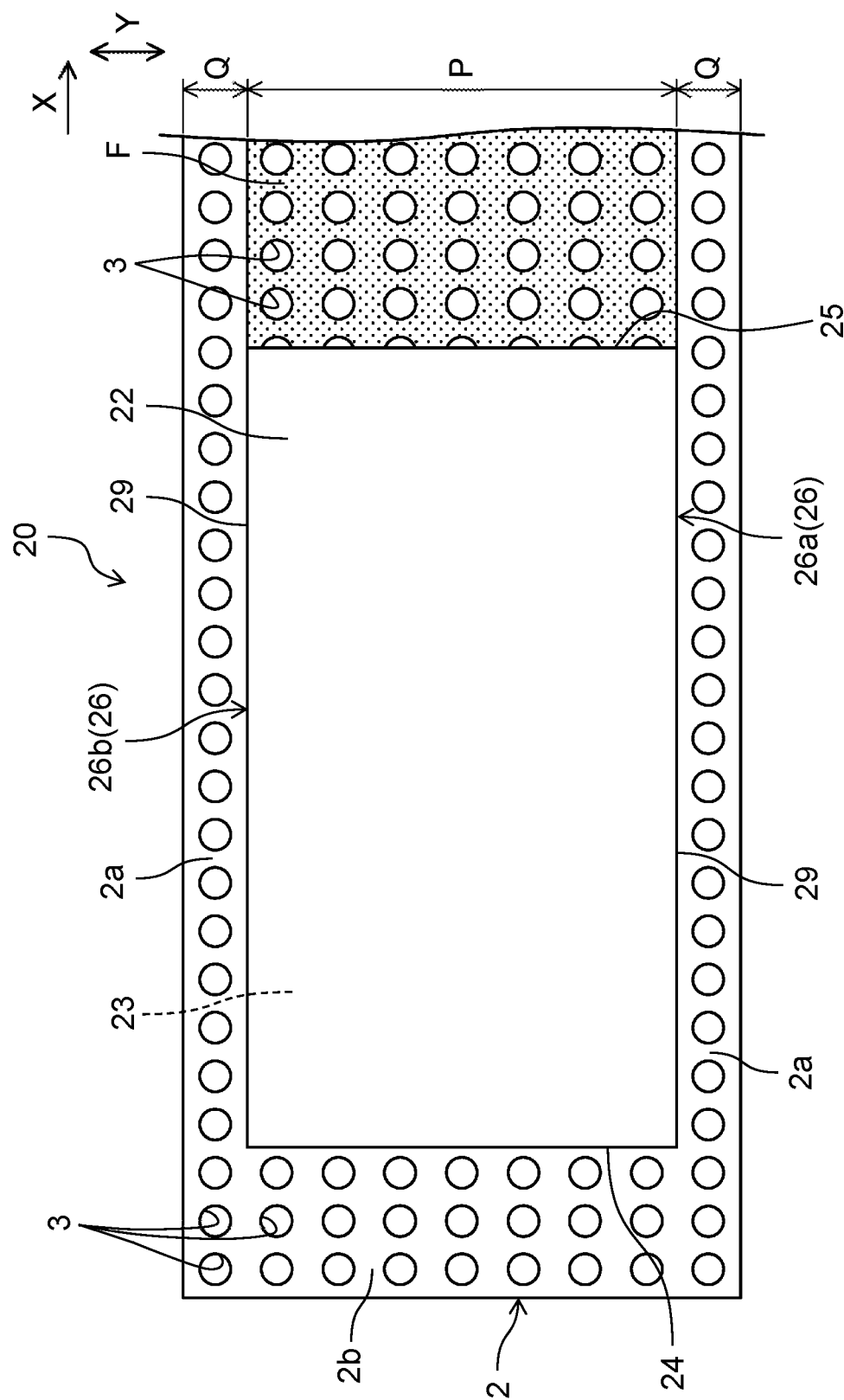
FIG. 14 is a plan view of a coating device according to a ninth embodiment.

Coating device 20 according to a ninth embodiment will be described with reference to FIG. 14. In the following description, the same components as those of the above-described embodiment are denoted by the same reference numerals, and a detailed description thereof may be omitted.

In the present embodiment, a plurality of punch holes 3 are formed in substrate 2. Other configurations are similar as those in the first embodiment.

According to the present embodiment, coating liquid C is also applied to inner peripheral surfaces of punch holes 3 formed in substrate 2 to form coating films F. Here, by setting length dimension L1 of each of blocks 21, 22 sufficiently larger than thickness dimension t of substrate 2, coating liquid C sufficiently wraps around the inner peripheral surfaces of punch holes 3.

Tenth Embodiment

Figure 15:
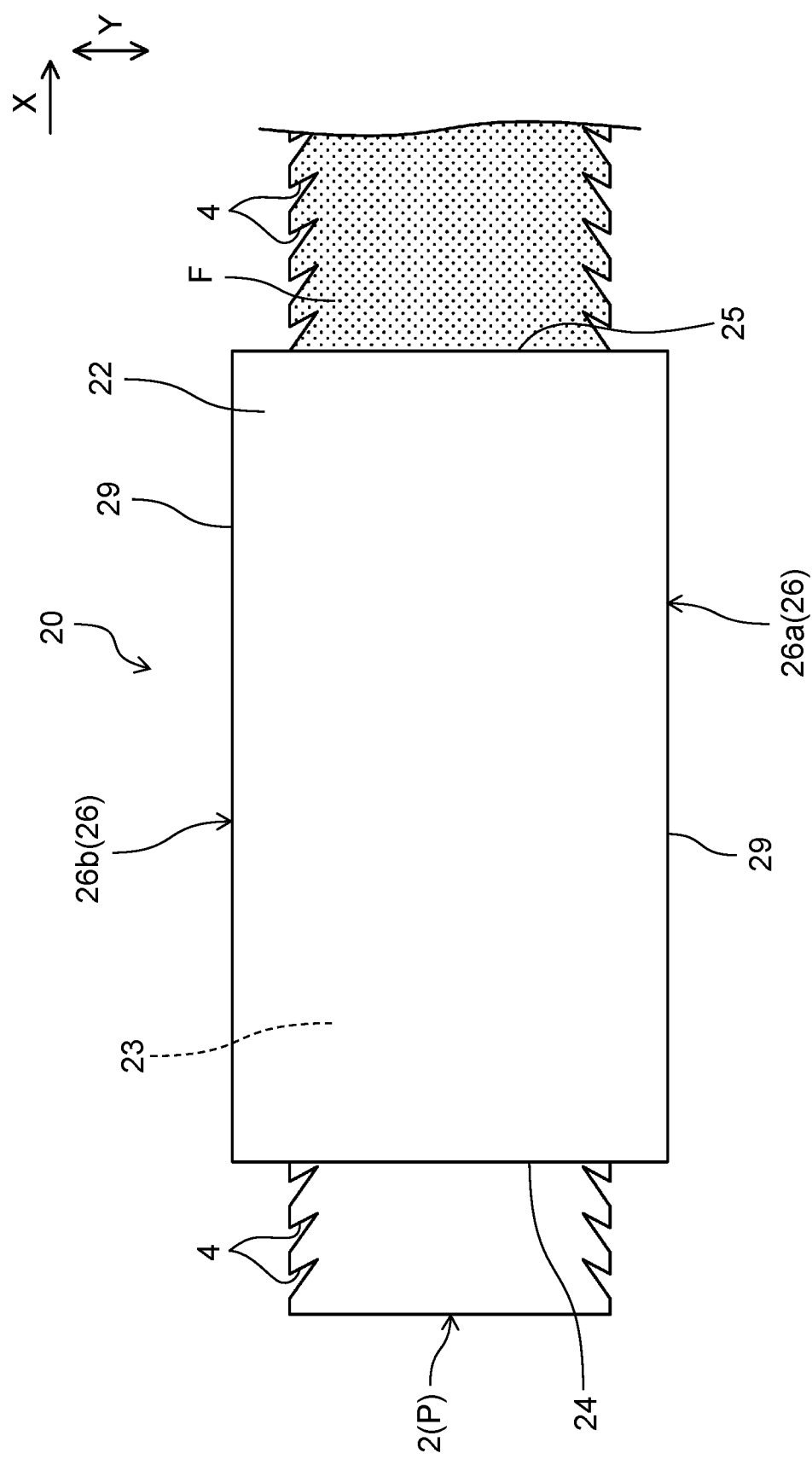
FIG. 15 is a plan view of a coating device according to a tenth embodiment.

Coating device 20 according to a tenth embodiment will be described with reference to FIG. 15. In the following description, the same components as those of the above-described embodiment are denoted by the same reference numerals, and a detailed description thereof may be omitted.

In the present embodiment, side surfaces of substrate 2 on both sides in the width direction are formed in a saw-tooth shape, and are provided with a plurality of teeth 4. Other configurations are similar as those in the third embodiment.

According to the present embodiment, coating liquid C is also applied to side surfaces of each tooth 4 on both sides in the transport direction to form coating films F. Here, by setting length dimension L1 of each of blocks 21, 22 sufficiently larger than thickness dimension t of substrate 2, coating liquid C sufficiently wraps around the side surfaces of each tooth 4 on both sides in the transport direction.

Eleventh Embodiment

Figure 16:
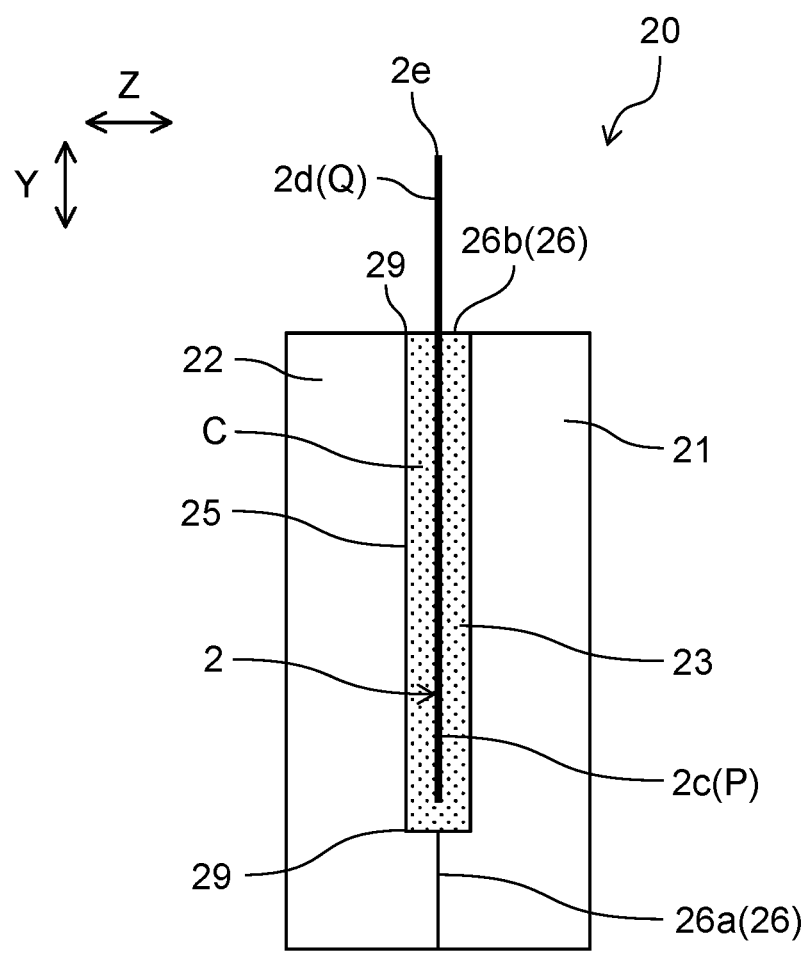
FIG. 16 is a side view of a coating device according to an eleventh embodiment.

Coating device 20 according to an eleventh embodiment will be described with reference to FIG. 16. In the following description, the same components as those of the above-described embodiment are denoted by the same reference numerals, and a detailed description thereof may be omitted.

In the present embodiment, exposure port 29 is provided only in side surface portion 26 on one side in the width direction. Specifically, exposure port 29 is provided only in second side surface portion 26b on the other side in the width direction. That is, first side surface portion 26a on one side in the width direction is closed.

First side surface portion 26a faces downward in the vertical direction. On the other hand, second side surface portion 26b faces upward in the vertical direction. That is, exposure port 29 is opened upward in the vertical direction.

According to the present embodiment, since the number of exposure port 29 is only one, it is advantageous in preventing the leakage of coating liquid C from liquid reservoir portion 23 as compared with the above-described embodiment.

By opening exposure port 29 provided in second side surface portion 26b upward in the vertical direction, first side surface portion 26a can be positioned below liquid reservoir portion 23 in the vertical direction. Therefore, coating liquid C accumulated in liquid reservoir portion 23 can be supported by closed first side surface portion 26a.

OTHER EMBODIMENTS

Although the present disclosure is described with reference to preferred embodiments, the description is not limited thereto, and various modifications can be made.

A shape of substrate 2 may be, for example, a comb tooth shape or a ladder shape. When the shape of substrate 2 is the comb tooth shape, coating liquid C is also applied to side surfaces of each comb tooth on both sides in the transport direction, and coating films F are formed. A distance between the comb teeth is preferably 0.1 mm or more and 1 mm or less. Here, by setting length dimension L1 of each of blocks 21, 22 sufficiently larger than thickness dimension t of substrate 2, for example, 100 times or more, coating liquid C sufficiently wraps around the side surfaces of each comb tooth on both sides in the transport direction. A case where the shape of substrate 2 is the ladder shape is also substantially the same as the case where the shape is the comb tooth shape.

Substrate 2 may be formed of a porous material. In this case, coating liquid C permeates into pores of the porous material, and coating films F are formed. By setting length dimension L1 of each of blocks 21, 22 sufficiently larger than thickness dimension t of substrate 2, for example, 500 times or more, coating liquid C sufficiently permeates into the pores.

In the above embodiment, the transport direction of substrate 2 substantially coincides with the horizontal direction orthogonal to the vertical direction, but the present disclosure is not limited thereto. Substrate 2 may be transported, for example, from an upper side to a lower side in the vertical direction or from the lower side to the upper side in the vertical direction.

Instead of providing supply pump 41, compressed air may be introduced into a supply tank and the liquid may be supplied under pressure.

In the fourth and fifth embodiments, coating liquid supply ports 30 provided in each of blocks 21, 22 face each other in the thickness direction with liquid reservoir portion 23 interposed therebetween (see FIG. 8), but the present disclosure is not limited thereto. Coating liquid supply ports 30 may be positioned so as to be displaced from each other in the transport direction or the width direction.

In the sixth embodiment, wetting and spreading prevention portion M is formed by making thickness dimension L3' of opening edge portion 31 of discharge port 25 in each of blocks 21, 22 smaller than thickness dimension L3 of other portions of each of blocks 21, 22 in the transport direction, but the present disclosure is not limited thereto. Wetting and spreading prevention portion M may be formed, for example, by controlling wettability of the surface of each of blocks 21, 22 on discharge port 25 side. Examples of a method of controlling the wettability includes a method of controlling the surface roughness, a method of forming a film by using a material having low affinity with coating liquid C, a method of using a fluorine-based resin such as PTFE, and the like.

In the above-described embodiment, coating device 20 is used for applying coating liquid C to both surfaces of substrate 2 continuously transported by the roll-to-roll method, but the present disclosure is not limited thereto. Coating device 20 may be used, for example, for applying coating liquid C to both surfaces of a glass substrate transported by a belt conveyor.

In a coating method according to the present disclosure, coating device 20 according to the above-described embodiment is used to apply coating liquid C to both surfaces of specific portion P of substrate 2 in the width direction by substrate 2 passing through coating device 20 while a part of substrate 2 in the width direction protruding from exposure ports 29 to the outside of liquid reservoir portion 23.

EXAMPLES

Setting Condition

Example

As substrate 2, an SUS304 material having a thickness of 0.1 mm was used.

As coating liquid C, a conductive paste having viscosity η of about 100 Pa·s was used. Viscosity η of coating liquid C was measured by using a rotary viscometer (Thermo Scientific Mars 40, manufactured by HAAKE). Measurement conditions of viscosity η were set to a stage diameter of 20 mm, a probe diameter of 20 mm, an angle of 1°, a measurement gap of 0.05 mm, a shear rate of 1/sec, and a measurement temperature of 25° C.

Coating device 20 (see FIGS. 1 to 5) according to the first embodiment was used. Specifically, as coating device 20, a desktop coating device (mini lab, manufactured by Yasui Seiki Co, .Ltd.) was used. First block 21 and second block 22 were formed of SUS304 material. In each of blocks 21, 22, length dimension L1 was set to 40 mm, width dimension L2 was set to 50 mm, and thickness dimension L3 was set to 10 mm. At a center of each of blocks 21, 22 in the width direction, a total of three circular supply ports each having a diameter of 2 mm were provided adjacently at intervals of 10 mm in the transport direction.

As supply pump 41, a mohno pump (3HMC010F, manufactured by HEISHIN Ltd.) was used. Both an unwinding torque and a winding torque of substrate supply device 10 were set to 60N·m.

Gap dimension H between first block 21 and second block 22 was freely set by using a shim. A coating speed (transporting speed) was freely set.

After coating films F were formed, coating films F were dried for 30 minutes at a set temperature of 200° C. and a fan rotation speed of 500 rpm by using a hot air drying furnace (DKM-400, manufactured by Yamato Scientific Co., Ltd) to obtain dried films.

Comparative Examples

A coating device in the related art different from that of the present disclosure was used. The conditions of coating liquid C and substrate 2 are the same as those in the example.
Measurement Condition A film thickness of coating film F was measured by using a micrometer (manufactured by Mitutoyo Corporation). The film thickness was set to a value obtained by subtracting thickness dimension t of substrate 2 before the formation of coating films F from thickness dimension T of substrate 2 after the formation of coating films F (see FIG. 5). A film thickness average value was calculated based on measured values obtained by measuring the film thickness at five points at intervals of 5 mm in a coating direction (transport direction). A film thickness variation was set to a value (in percentage) obtained by calculating standard deviation $3\sigma$ based on the measured values at five points and dividing standard deviation $3\sigma$ by the film thickness average value. A surface roughness was set to an arithmetic average roughness measured by using a one-shot 3D shape measuring machine (VR-3200, manufactured by Keyence).
Measurement Result Example 1

Gap dimension H was set to 0.2 mm, and the coating speed (transporting speed) was set to 0.2 m per minute. The average film thickness was 7.6 μm, the film thickness variation was 28%, and the surface roughness was 2.5 μm, and a good result was obtained.

Example 2

Gap dimension H was set to 0.2 mm, and the coating speed (transporting speed) was set to 0.5 m per minute. The average film thickness was 14.8 μm, the film thickness variation was 29%, and the surface roughness was 2.0 μm, and a good result was obtained.

Example 3

Gap dimension H was set to 0.2 mm, and the coating speed (transporting speed) was set to 1 m per minute. The average film thickness was 17.9 μm, the film thickness variation was 29%, and the surface roughness was 2.8 μm, and a good result was obtained.

Example 4

In contrast to Example 1, a cut portion was formed in substrate 2. Other conditions were the same as those in Example 1. Coating films F were also formed on side surfaces of the cut portion of substrate 2.

Comparative Example 1

Roll transfer was used. A gap between a roll and substrate 2 was set to 0 mm, and the coating speed (transporting speed) was set to 1 m per minute. The average film thickness was 7.2 µm, the film thickness variation was 65%, the surface roughness was 3.8 µm, and the film thickness variation and the surface roughness were worse than those of Examples 1 to 4.

Comparative Example 2

A slit die was used. A gap between the slit die and substrate 2 was set to 0.05 mm, and the coating speed (transporting speed) was set to 1 m per minute. The average film thickness was 15.0 µm, the film thickness variation was 31%, and the surface roughness was 3.3 µm, which is a result better than that of Comparative Example 1. However, when the film thickness is further reduced, the coating omission occurs, and it is difficult to form a uniform coating film.

Comparative Example 3

In contrast to Comparative Example 2, a cut portion was formed in substrate 2. Other conditions were the same as those in Comparative Example 2. No coating film F was formed on side surfaces of the cut portion of substrate 2.

Since the present disclosure can be applied to a coating device and a coating method, the present disclosure is extremely useful and has a high industrial availability.

What is claimed is:

1. A coating device configured to apply a coating liquid to both surfaces of a substrate that has a sheet shape and is transported, comprising:
    a pair of blocks facing each other in a thickness direction of the substrate, each of the pair of blocks having a rectangular parallelpiped shape, the pair of blocks being disposed symmetrically with respect to the thickness direction and such that a longitudinal direction of each of the pair of blocks extends along a transport direction of the substrate; and
    a liquid reservoir that is formed such that the coating liquid is accumulated in a gap between the pair of blocks, and through which the substrate passes, wherein
    the liquid reservoir includes:
        an introduction port that is opened on an upstream side in the transport direction of the substrate and through which the substrate is introduced,
        a discharge port that is opened on a downstream side in the transport direction and through which the substrate is discharged, and
        side surface portions respectively positioned on both sides in a width direction intersecting the transport direction,
    one of the side surface portions has an exposure port that is opened from the introduction port to the discharge port, and
    a part of the substrate in the width direction is configured to protrude from the exposure port to an outside of the liquid reservoir.

2. The coating device according to claim 1, wherein the other of the side surface portions has an exposure port that is opened from the introduction port to the discharge port.

3. The coating device according to claim 1, wherein the exposure port is provided only in the one of the side surface portions, and
the exposure port is opened upward in a vertical direction.

4. The coating device according to claim 1, wherein each of the pair of blocks is provided with, on a surface facing the liquid reservoir, a coating liquid supply port through which the coating liquid is supplied to the liquid reservoir, and
the coating liquid supply ports face each other with the liquid reservoir interposed therebetween.

5. The coating device according to claim 1, wherein the gap is wider on an introduction port side than on a discharge port side.

6. The coating device according to claim 5, wherein the gap is narrowed from the introduction port side toward the discharge port side in the transport direction.

7. The coating device according to claim 1, wherein an opening edge portion of the discharge port in each of the pair of blocks has a thickness smaller than other portions of the pair of blocks in the transport direction, and a wetting and spreading prevention portion configured to prevent wetting and spreading of the coating liquid is formed.

8. The coating device according to claim 1, wherein the gap is 0.1 mm or more and 1 mm or less.

9. A coating method using the coating device according to claim 1, the coating method comprising:
    applying the coating liquid to the both surfaces of a specific portion of the substrate in the width direction of the substrate, by passing the substrate through the coating device while the part of the substrate in the width direction protrudes from the exposure port to the outside of the liquid reservoir.

10. The coating device according to claim 1, wherein a plurality of punch holes are formed in the substrate, and each of the pair of blocks has a length larger than a thickness of the substrate such that the coating liquid wraps around an inner peripheral surface of each of the punch holes.

* * * * *